United States Patent
Ooshima et al.

(10) Patent No.: US 9,897,202 B2
(45) Date of Patent: Feb. 20, 2018

(54) TEMPERATURE WARNING DEVICE AND TEMPERATURE WARNING METHOD OF FRICTION ELEMENT

(71) Applicant: Nissan Motor Co., Ltd., Kanagawa (JP)

(72) Inventors: Kenichi Ooshima, Shizuoka (JP); Takeshi Yamamoto, Shizuoka (JP); Hidetoshi Tsukidate, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 41 days.

(21) Appl. No.: 14/783,445

(22) PCT Filed: Feb. 12, 2014

(86) PCT No.: PCT/JP2014/053133
§ 371 (c)(1),
(2) Date: Oct. 9, 2015

(87) PCT Pub. No.: WO2014/167893
PCT Pub. Date: Oct. 16, 2014

(65) Prior Publication Data
US 2016/0076644 A1   Mar. 17, 2016

(30) Foreign Application Priority Data
Apr. 10, 2013   (JP) .................. 2013-082202

(51) Int. Cl.
*F16H 59/72*   (2006.01)
*F16H 61/12*   (2010.01)
*F16D 48/06*   (2006.01)

(52) U.S. Cl.
CPC ............. *F16H 61/12* (2013.01); *F16D 48/06* (2013.01); *F16H 59/72* (2013.01);
(Continued)

(58) Field of Classification Search
CPC .. F16H 61/12; F16H 59/72; F16H 2061/1216; F16H 2059/725;
(Continued)

(56) References Cited

U.S. PATENT DOCUMENTS 5,218,836 A * 6/1993 Jarosch .................. B60H 1/321
62/157
5,857,162 A * 1/1999 Vukovich ............... F16H 59/72
477/65
(Continued)

FOREIGN PATENT DOCUMENTS

JP   2008-57670 A   3/2008

*Primary Examiner* — Roger L Pang
(74) *Attorney, Agent, or Firm* — Osha Liang LLP

(57) ABSTRACT

A temperature warning method of a friction element for issuing a warning depending on temperature of the friction element arranged between a power source and a driving wheel, includes issuing the warning when the temperature of the friction element exceeds an upper limit temperature, and making a period of time, from when the temperature of the friction element exceeds the upper limit temperature until when the warning is issued, longer when the temperature of the friction element exceeds the upper limit temperature for a first time than when the temperature of the friction element exceeds the upper limit temperature for a second or subsequent time.

4 Claims, 5 Drawing Sheets

(52) U.S. Cl.
CPC .............. *F16D 2500/30404* (2013.01); *F16D 2500/3166* (2013.01); *F16D 2500/5106* (2013.01); *F16D 2500/7101* (2013.01); *F16D 2500/7103* (2013.01); *F16H 2059/725* (2013.01); *F16H 2061/1216* (2013.01); *F16H 2061/1276* (2013.01); *Y10T 477/65* (2015.01); *Y10T 477/653* (2015.01); *Y10T 477/753* (2015.01)

(58) Field of Classification Search
CPC ... F16H 2061/1276; F16D 2500/30404; F16D 2500/5106; F16D 2500/7101; F16D 2500/7103; Y10T 477/65; Y10T 477/653; Y10T 477/753
USPC ...................................................... 701/65, 62
See application file for complete search history.

(56) References Cited

U.S. PATENT DOCUMENTS

| | | | |
|---|---|---|---|
| 2010/0075804 A1* | 3/2010 | Ryberg .................... | F16D 48/08 477/174 |
| 2010/0200357 A1* | 8/2010 | Okabe .................... | F16D 48/066 192/30 W |
| 2012/0261228 A1 | 10/2012 | Chen et al. | |
| 2014/0098060 A1* | 4/2014 | McQuade ................ | G06F 3/045 345/174 |
| 2014/0195310 A1* | 7/2014 | McQuade ........ | G06Q 10/06393 705/7.39 |
| 2015/0353098 A1* | 12/2015 | Percy .................... | B60W 50/16 701/53 |
| 2016/0264141 A1* | 9/2016 | Brunner .................. | F16D 48/06 |

* cited by examiner

TEMPERATURE WARNING DEVICE AND TEMPERATURE WARNING METHOD OF FRICTION ELEMENT

CROSS-REFERENCE TO RELATED APPLICATIONS

The present application is a national stage application of PCT/JP2014/053133 filed Feb. 12, 2014, and claims a priority to Japanese Patent Application No. 2013-82202 filed with the Japan Patent Office on Apr. 10, 2013, the contents of which are hereby incorporated by reference in their entirety.

BACKGROUND

Technical Field

The present invention relates to a technique of issuing a warning depending on temperature of a friction element.

Related Art

When temperature of a friction element that is used for a power train, such as a clutch, a brake, or the like, becomes high, seizure or burnout is caused. In JP2008-57670A, therefore, heating quantity of the friction element is calculated based on a rotation speed difference of the friction element and input torque to the friction element and, based on the calculated heating quantity, the temperature of the friction element is estimated. When the estimated temperature of the friction element exceeds upper limit temperature, a warning lamp is turned on.

SUMMARY OF INVENTION

However, heat resistance of the friction element differs depending on whether or not the friction element experiences burning exceeding the upper limit temperature, and the heat resistance is higher when the friction element has no experience of burning than when the friction element has the experience of burning.

When the same upper limit temperature as that of the friction element having the experience of burning is used for the friction element without the experience of burning, a warning is excessively issued by the warning lamp when the friction element does not have the experience of burning, thus giving insecure feelings to a driver.

One or more embodiments of the present invention appropriately issues a warning when the temperature of the friction element becomes high.

According to one or more embodiments of the present invention, a temperature warning device of a friction element for issuing a warning depending on temperature of the friction element arranged between a power, source and a driving wheel, is provided. The temperature warning device comprises warning issuing means adapted to issue the warning when the temperature of the friction element exceeds upper limit temperature, and warning issuing timing adjusting means adapted to make a period of time, from when the temperature of the friction element exceeds the upper limit temperature until when the warning issuing means issues the warning, longer when the temperature of the friction element exceeds the upper limit temperature for a first time, than when the temperature of the friction element exceeds the upper limit temperature for a second or subsequent time.

According to one or more embodiments of the present invention, a corresponding temperature warning method of a friction element is provided.

According to one or more embodiments of the present invention, when the temperature of the friction element exceeds the upper limit temperature for a first time, the period of time until the warning is issued is made longer. Therefore, it becomes possible to call attention to the driver at more appropriate timing, corresponding to the heat resistance of the friction element.

DETAILED DESCRIPTION

Embodiments of the present invention will be explained with reference to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
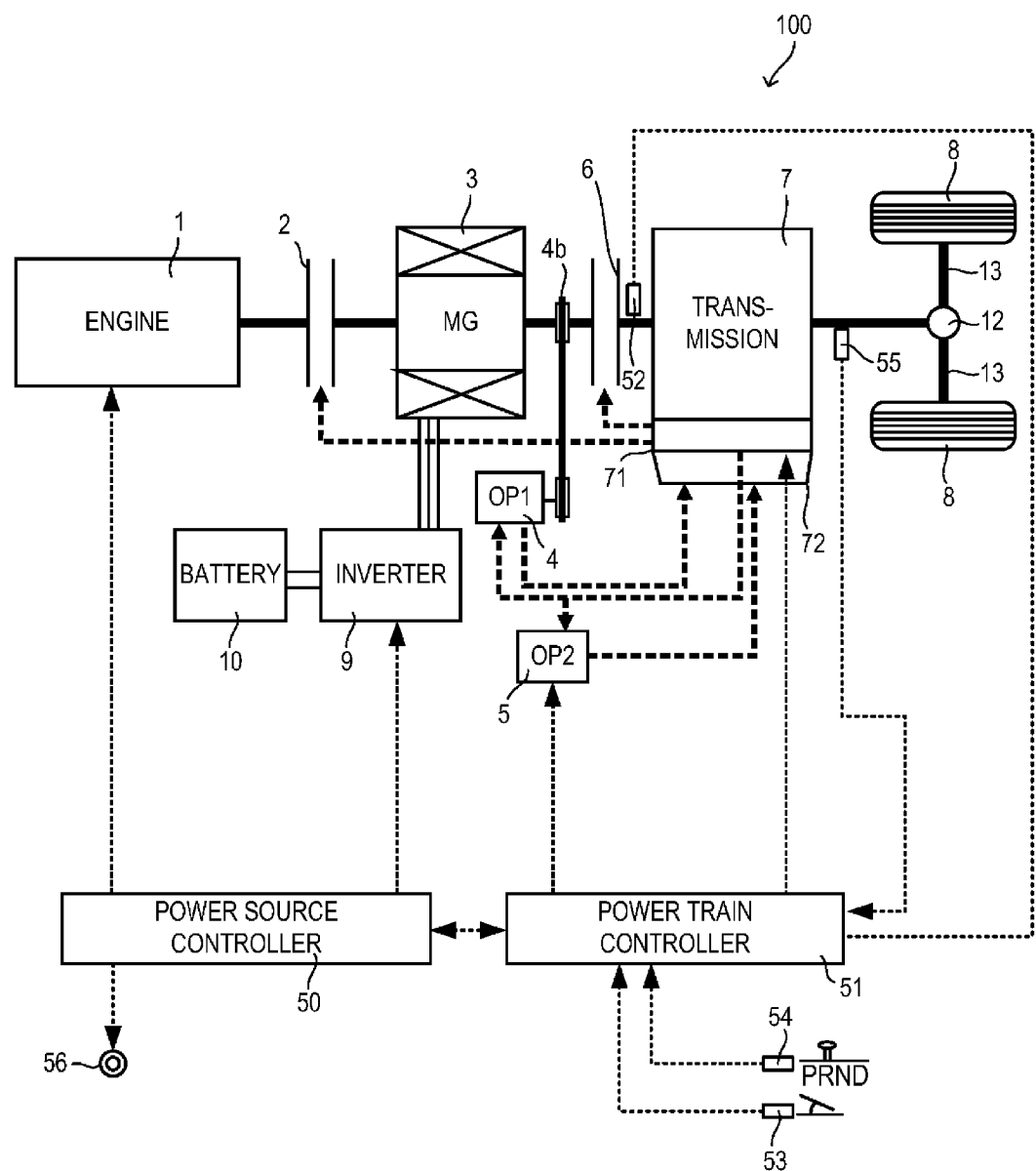
FIG. 1 is a schematic block diagram of a hybrid vehicle.

FIG. 1 is an overall block diagram of a hybrid vehicle (hereinafter referred to as the vehicle) 100. The vehicle 100 is provided with an engine 1, a first clutch 2, a motor generator (hereinafter referred to as the MG) 3, a first oil pump 4, a second oil pump 5, a second clutch 6, a transmission 7, driving wheels 8, a power source controller 50, and a power train controller 51.

The engine 1 is an internal combustion engine that uses gasoline, diesel fuel or the like as fuel, and its rotation speed, torque and the like are controlled based on a command from the power source controller 50.

The first clutch 2 is a normal-open hydraulic clutch that is interposed between the engine 1 and the MG 3. Based on a command from the power train controller 51, a state of engagement/release of the first clutch 2 is controlled by hydraulic pressure, whose pressure is adjusted by a hydraulic control valve unit 71 by using discharge pressure from the first oil pump 4 or the second oil pump 5 as original pressure. A multi-plate dry clutch is used as the first clutch 2, for example.

The MG 3, arranged in series with the engine 1, is a synchronous rotary electric machine, in which a permanent magnet is embedded in a rotor and a stator coil is wound around a stator, and serves as a power source of the vehicle 100 together with the engine 1. Based on a command from the power source controller 50, the MG 3 is controlled by application of a three-phase alternating current that is made by an inverter 9. The MG 3 may be operated as an electric motor that is rotatively driven by receiving supply of electric power from a battery 10. When the rotor receives rotational energy from the engine 1 and the driving wheels 8, the MG 3 may function as a power generator that causes electromotive force at both ends of the stator coil, and may charge the battery 10.

The first oil pump 4 is a vane pump that is operated by transmission of rotation of the MG 3 via a belt 4b. The first oil pump 4 sucks hydraulic oil stored in an oil pan 72 of the transmission 7, and supplies hydraulic pressure to the hydraulic control valve unit 71.

The second oil pump 5 is an electric oil pump that is operated by receiving supply of the electric power from the battery 10. Based on a command from the power train controller 51, the second oil pump 5 is driven when oil quantity is not enough by the first oil pump 4 only. Similarly to the first oil pump 4, the second oil pump 5 sucks the hydraulic oil stored in the oil pan 72 of the transmission 7, and supplies the hydraulic pressure to the hydraulic control valve unit 71.

The second clutch 6 is interposed between the MG 3 and the transmission 7 and driving wheels 8. Based on a command from the power train controller 51, engagement/release of the second clutch is controlled by the hydraulic pressure, whose pressure is adjusted by the hydraulic control valve unit 71 by using the discharge pressure from the first oil pump 4 or the second oil pump 5 as the original pressure. A normal-open multi-plate wet clutch is used as the second clutch 6, for example.

The transmission 7 is a multi-gear-position transmission with 7 forward gear positions and 1 backward gear position, the multi-gear position transmission being formed by a plurality of planetary gear mechanisms and a plurality of friction elements (a clutch or a brake) for realizing the gear positions. Shift of the transmission 7 is made in such a manner that, by setting a target gear position based on vehicle speed and accelerator opening, the hydraulic pressure, supplied from the hydraulic control valve unit 71 to the plurality of friction elements for realizing the gear positions, is controlled so as to cause a combination of the engaged friction elements to become a combination corresponding to the target gear position.

A differential 12 is connected to an output shaft of the transmission 7 via a not-illustrated final speed reduction gear mechanism, and the driving wheels 8 are connected to the differential 12 via drive shafts 13.

The power source controller 50 and the power train controller 51 are connected via a CAN, and are able to deliver various signals via the CAN. The signals delivered from the power train controller 51 to the power source controller 50 include a temperature output value TCL2OUT of the second clutch 6, as will be described later. When the temperature of the second clutch 6 becomes high, the power source controller 50 turns a warning lamp 56 on, and makes torque-down control of the engine 1 and the MG 3 when required.

Signals from a rotation speed sensor 52 that detects output rotation speed of the second clutch 6 (=input rotation speed of the transmission 7), an accelerator opening sensor 53 that detects accelerator opening, an inhibitor switch 54 that detects a select position of the transmission 7 (state of a select lever or a select switch that switches between forward, backward, neutral and parking), a vehicle speed sensor 55 that detects the vehicle speed and the like are inputted to the power train controller 51. Based on these inputted signals, the power train controller 51 makes shift control of the transmission 7, later-described mode switching control, and WSC control.

Figure 2:
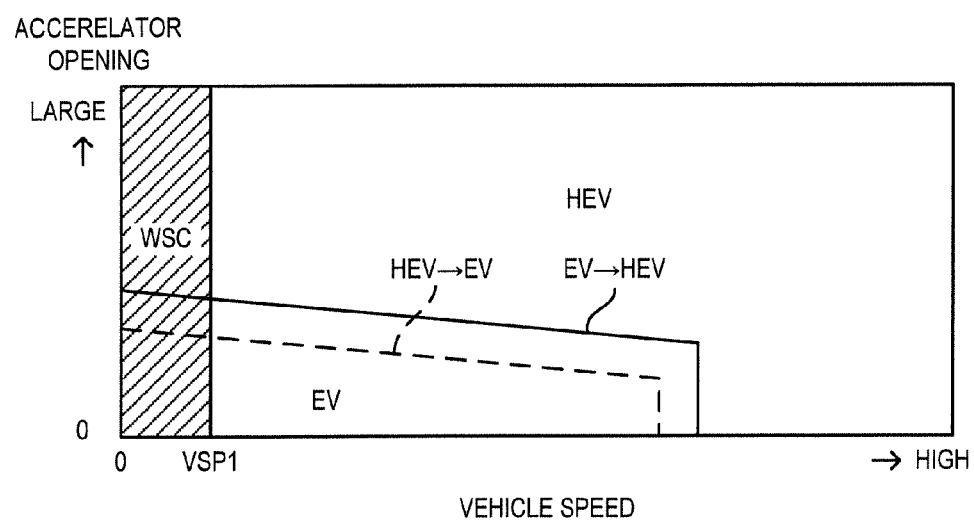
FIG. 2 is an example of a mode switching map.

In the mode switching control, the power train controller 51 refers to a mode switching map as illustrated in FIG. 2, and switches between an EV mode and an HEV mode as an operation mode of the vehicle 100.

With the EV mode, the first clutch 2 is released and the vehicle 100 travels by using only the MG 3 as a driving source. The EV mode is selected when required driving force is small and a charge amount of the battery 10 is enough.

With the HEV mode, the first clutch 2 is engaged and the vehicle 100 travels by using the engine 1 and the MG 3 as the driving source. The HEV mode is selected when the required driving force is large or the charge amount of the battery 10 is not enough.

In order to prevent hunting at the time of switching between the EV mode and the HEV mode, a switching line from the EV mode to the HEV mode is set on a higher vehicle speed side and on a larger accelerator opening side, as compared with a switching line from the HEV mode to the EV mode.

As the vehicle 100 is not provided with a torque converter, the power train controller 51 makes the WSC control, by which the vehicle 100 is started and stopped while causing the second clutch 6 to slip, in a WSC region as illustrated in FIG. 2 (in a low vehicle speed region where the vehicle speed is VSP1 or less, at the time of start, deceleration and stop, wherein VSP1 is 10 km/h, for example).

Specifically, when the vehicle 100 starts by switching the select position of the transmission 7 from a non-traveling position (N, P or the like) to a traveling position (D, R or the like), the power train controller 51 gradually increases the hydraulic pressure to be supplied to the second clutch 6, and causes the second clutch 6 to slip and to be engaged gradually. When the vehicle speed reaches VSP1, the power train controller 51 causes the second clutch 6 to be fully engaged, and finishes the WSC control.

When the vehicle 100 travels while the select position of the transmission 7 is in the traveling position (D, R or the like) and when the vehicle 100 decelerates and its vehicle speed decreases to VSP1, the power train controller 51 gradually decreases the hydraulic pressure to be supplied to the second clutch 6, and causes the second clutch 6 to slip and to be released gradually. When the vehicle 100 stops, the power train controller 51 causes the second clutch 6 to be fully released, and finishes the WSC control.

As the second clutch 6 is caused to slip in the above-described WSC control, heating quantity of the second clutch 6 increases and the temperature of the second clutch 6 (the temperature of a facing) increases. Especially when the WSC control is made on a climbing road, the temperature rise of the second clutch 6 becomes remarkable.

For this reason, it is necessary to monitor the temperature of the second clutch 6 and, when the temperature of the second clutch 6 becomes high, to call attention to a driver by turning the warning lamp 56 on, and to make the torque-down control of the engine 1 and the MG 3 when necessary, so as to protect the second clutch 6 from seizure or burnout.

In connection with the above, control made by the power source controller 50 and the power train controller 51 will be explained below.

Figure 3:
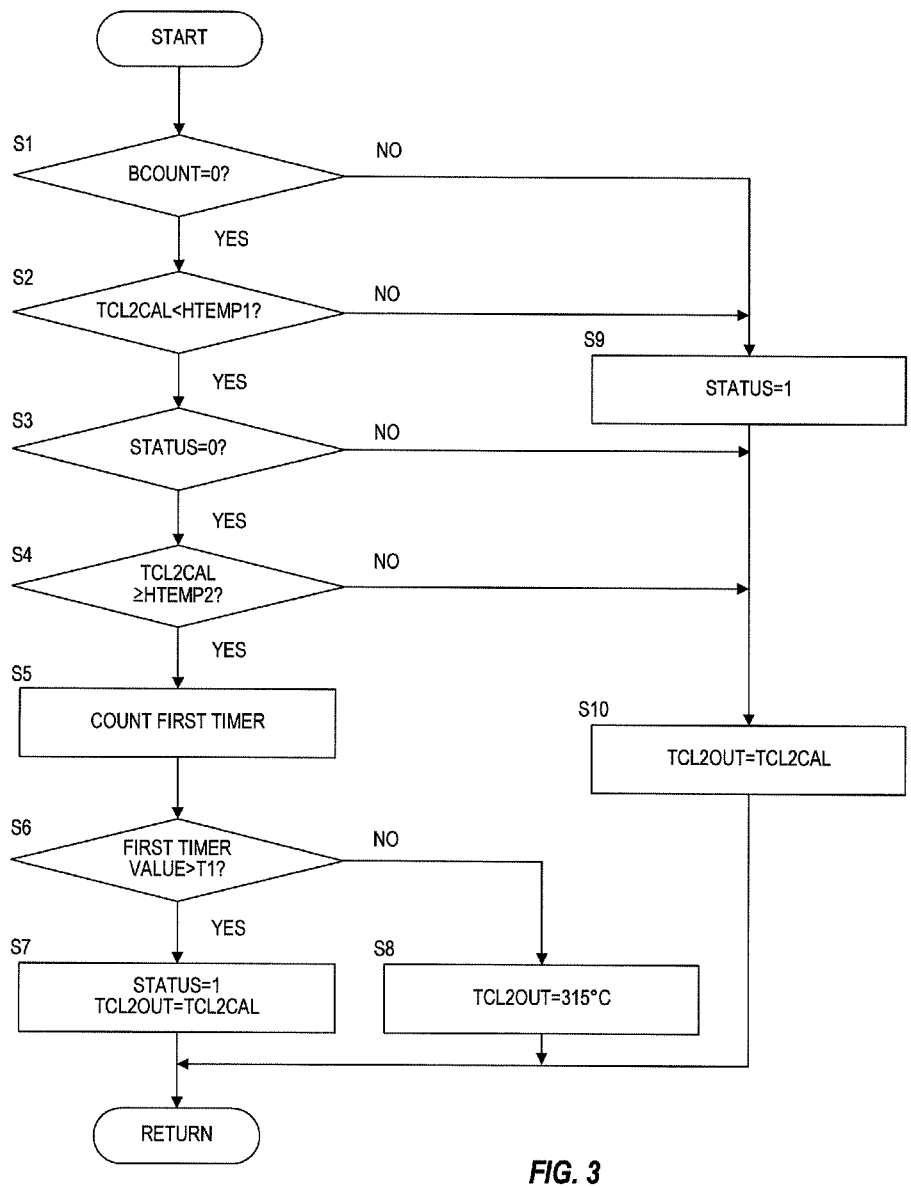
FIG. 3 is a flowchart illustrating details of setting processing of a temperature output value of a second clutch.

FIG. 3 is a flowchart illustrating the details of setting processing of the temperature output value TCL2OUT of the second clutch 6, which is executed repeatedly by the power train controller 51.

Figure 4:
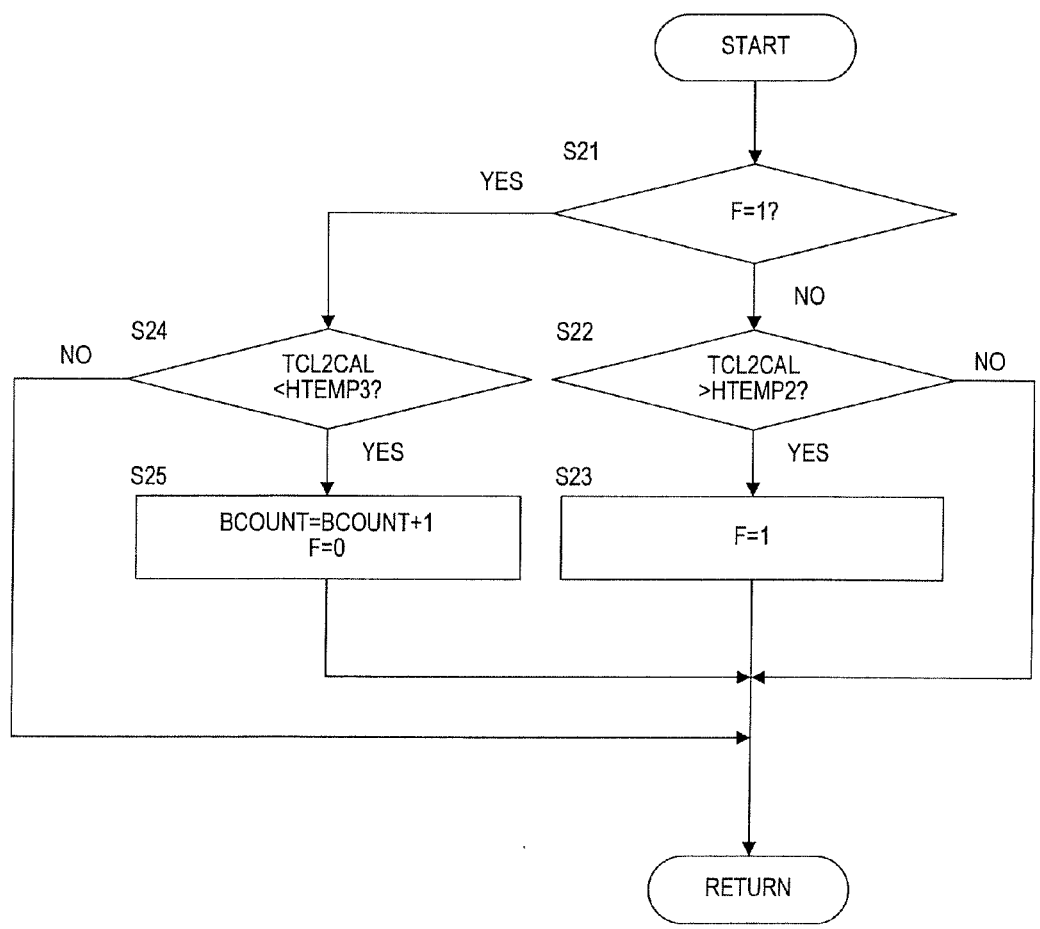
FIG. 4 is a flowchart illustrating details of updating processing of a burning history.

Specifically, in S1, the power train controller 51 determines whether a burning history BCOUNT is 0 or not. The burning history BCOUNT is a value counting a number of times when a temperature calculation value TCL2CAL of the second clutch 6 exceeds an upper limit temperature HTEMP2 (320° C., for example) by the later-described processing as illustrated in FIG. 4. The upper limit temperature HTEMP2 is an upper limit value of a range of the temperature that the second clutch 6 can maintain without the seizure or the burnout. Even though the seizure or the burnout is not caused immediately when the temperature of the second clutch 6 becomes the upper limit temperature HTEMP2 or more, the seizure or the burnout is caused when the temperature is equal to or more than the upper limit temperature HTEMP2 for a continuous period of time. When 0 is stored in the burning history BCOUNT, the processing proceeds to S2.

In S2, the power train controller 51 determines whether or not the temperature calculation value TCL2CAL of the second clutch 6 is lower than a critical temperature HTEMP1 (560° C., for example). The temperature calculation value TCL2CAL of the second clutch 6 can be calculated based on the calculated heating quantity of the second clutch 6 and heat radiation quantity from the second clutch 6 and the like, the heating quantity of the second clutch 6 being calculated based on a rotation speed difference of the second clutch 6 and input torque to the second clutch 6. The critical temperature HTEMP1 is the temperature at which the temperature of the second clutch 6 needs to be lowered immediately in order to protect the second clutch 6 from the seizure or the burnout. When the temperature calculation value TCL2CAL of the second clutch 6 is lower than the critical temperature HTEMP1, the processing proceeds to S3.

In S3, the power train controller 51 determines whether or not a value of a flag STATUS is 0. An initial value of the flag STATUS is 0, and hence the processing proceeds to S4 when the processing is executed for the first time.

In S4, the power train controller 51 deter mines whether or not the temperature calculation value TCL2CAL of the second clutch 6 is an upper limit temperature HTEMP2 or more. When the temperature calculation value TCL2CAL of the second clutch 6 is the upper limit temperature HTEMP2 or higher, the processing proceeds to S5.

In S5, the power train controller 51 starts count of a first timer. The first timer measures a period of time from when the temperature calculation value TCL2CAL of the second clutch 6 becomes the upper limit temperature HTEMP2 or more and during when the state continues.

In S6, the power train controller 51 determines whether or not the value of the first timer exceeds a predetermined period of time T1 (five seconds, for example). When the value of the first timer does not exceed the predetermined period of time T1, the processing proceeds to S8, where the power train controller 51 outputs, as the temperature output value TCL2OUT of the second clutch 6, a constant value that is by a few degrees lower than the upper limit temperature HTEMP2 (315° C., for example) to the power source controller 50. On the other hand, when the value of the first timer exceeds the predetermined period of time T1, the processing proceeds to S7, where the power train controller 51 sets the flag STATUS as 1 and outputs, as the temperature output value TCL2OUT of the second clutch 6, the temperature calculation value TCL2CAL of the second clutch 6 to the power source controller 50.

Meanwhile, when it is determined that the burning history BCOUTURE is not 0 in S1, the processing proceeds to S9, where the flag STATUS is set as 1. Then, in S10, the power train controller 51 outputs, as the temperature output value TCL2OUT of the second clutch 6, the temperature calculation value TCL2CAL of the second clutch 6 to the power source controller 50.

Further, when it is determined that the flag STATUS is not 0 in S3, and when it is determined that the temperature calculation value TCL2CAL of the second clutch 6 is lower than the upper limit temperature HTEMP2 in S4, the processing proceeds to S10, where the power train controller 51 outputs, as the temperature output value TCL2OUT of the second clutch 6, the temperature calculation value TCL2CAL of the second clutch 6 to the power source controller 50.

Therefore, according to the above-described processing, the temperature calculation value TCL2CAL of the second clutch 6 is outputted, as the temperature output value TCL2OUT of the second clutch 6, to the power source controller 50 in the case:

when the temperature calculation value TCL2CAL of the second clutch 6 is higher than the critical temperature HTEMP1;

when the temperature calculation value TCL2CAL of the second clutch 6 is lower than the upper limit temperature HTEMP2; or when the temperature calculation value TCL2CAL of the second clutch 6 exceeds the upper limit temperature HTEMP2 and the predetermined period of time T1 has elapsed from when the temperature calculation value TCL2CAL of the second clutch 6 exceeds the upper limit temperature HTEMP2.

Meanwhile, during the period from when the temperature calculation value TCL2CAL of the second clutch 6 exceeds the upper limit temperature HTEMP2 until when the predetermined period of time T1 has elapsed, the constant value (pseudo temperature) that is lower than the upper limit temperature HTEMP2 is outputted to the power source controller 50 as the temperature output value TCL2OUT of the second clutch 6, instead of the temperature calculation value TCL2CAL of the second clutch 6.

FIG. 4 is a flowchart illustrating the details of updating processing of the burning history BCOUNT, which is executed repeatedly by the power train controller 51.

Specifically, in S21, the power train controller 51 determines whether a flag F is 1 or not. An initial value of the flag F is 0, and hence the processing proceeds to S22 when the processing is executed for the first time.

In S22, the power train controller 51 determines whether or not the temperature calculation value TCL2CAL of the second clutch 6 is higher than the upper limit temperature HTEMP2. When it is determined that the temperature calculation value TCL2CAL of the second clutch 6 is higher than the upper limit temperature HTEMP2, the processing proceeds to S23, where the flag F is set as 1.

When the flag F is set as 1, the processing proceeds from S21 to S24 when S21 is executed for the next time.

In S24, the power train controller 51 determines whether or not the temperature calculation value TCL2CAL of the second clutch 6 is lower than a burning completion determination temperature HTEMP3 (300° C., for example) that is sufficiently lower than the upper limit temperature HTEMP2. When it is determined that the temperature calculation value TCL2CAL of the second clutch 6 is lower than the burning completion determination temperature HTEMP3, the processing proceeds to S25, where 1 is added to the burning history BCOUNT and the flag F is set as 0.

Therefore, according to the above-described processing, 1 is added to the burning history BCOUNT at timing when the temperature calculation value TCL2CAL of the second clutch 6 exceeds the upper limit temperature HTEMP2 and thereafter the temperature calculation value TCL2CAL of the second clutch 6 becomes lower than the burning completion determination temperature HTEMP3.

Figure 5:
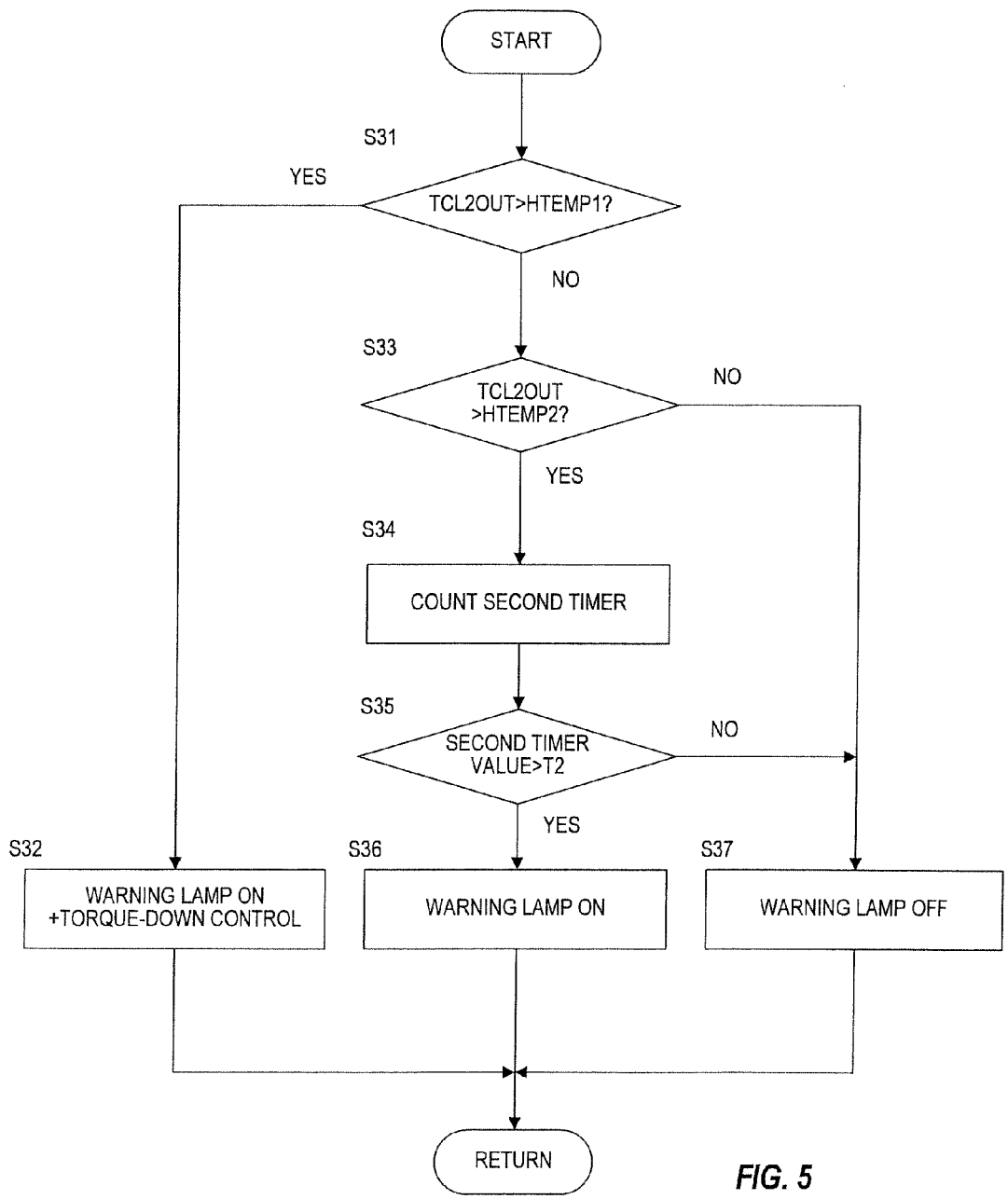
FIG. 5 is a flowchart illustrating details of protecting processing of the second clutch.

FIG. 5 is a flowchart illustrating the details of protecting processing of the second clutch 6, which is executed repeatedly by the power source controller 50.

Specifically, in S31, the power source controller 50 determines whether or not the temperature output value TCL2OUT of the second clutch 6, received from the power train controller 51, exceeds the critical temperature HTEMP1. When the temperature output value TCL2OUT of the second clutch 6 exceeds the critical temperature HTEMP1, the processing proceeds to S32, where the power source controller 50 turns the warning lamp 56 on and makes torque-down control of the engine 1 and the MG 3.

When the temperature output value TCL2OUT of the second clutch 6 does not exceed the critical temperature HTEMP1, the processing proceeds to S33.

In S33, the power source controller 50 determines whether or not the temperature output value TCL2OUT of the second clutch 6 exceeds the upper limit temperature HTEMP2. When the temperature output value TCL2OUT of the second clutch 6 exceeds the upper limit temperature HTEMP2, the processing proceeds to S34.

In S34, the power source controller 50 starts count of a second timer. The second timer measures a period of time from when the temperature output value TCL2OUT of the second clutch 6 exceeds the upper limit temperature HTEMP2 and during when the state continues.

In S35, the power source controller 50 determines whether or not the second timer exceeds a predetermined period of time T2 (five seconds, for example). When the second timer exceeds the predetermined period of time T2, the processing proceeds to S36, where the power source controller 50 turns the warning lamp 56 on. When the second timer does not exceed the predetermined period of time T2, the processing proceeds to S37 and the power source controller 50 does not turn the warning lamp 56 on.

Therefore, according to the above-described processing, the warning lamp 56 is turned on in the case:

when the temperature output value TCL2OUT of the second clutch 6 exceeds the critical temperature HTEMP1; or when the temperature output value TCL2OUT of the second clutch 6 exceeds the upper limit temperature HTEMP2 and this state is continued for the predetermined period of time T2.

Further, in the former case, the torque-down control of the engine 1 and the MG 3 is also made, so as to quickly suppress the temperature rise of the second clutch 6.

Next, an explanation will be given to operations and effects of the control executed by the power source controller 50 and the power train controller 51, as illustrated in FIG. 3 to FIG. 5.

According to the above-described processing, the warning lamp 56 is turned on when the temperature output value TCL2OUT of the second clutch 6, outputted from the power train controller 51 to the power source controller 50, exceeds the upper limit temperature HTEMP2, and the state continues for the predetermined period of time T2 (S35→S36 in FIG. 5).

However, when the temperature calculation value TCL2CAL of the second clutch 6 exceeds the upper limit temperature HTEMP2 for the first time (YES in S1 of FIG. 3), the temperature calculation value TCL2CAL of the second clutch 6 is not outputted as the temperature output value TCL2OUT of the second clutch 6 as it is, and the constant value (pseudo temperature) that is lower than the upper limit temperature HTEMP2 is outputted as the temperature output value TCL2OUT of the second clutch 6, during the predetermined period of time T1 (S6→S8 in FIG. 3).

Therefore, from when the temperature calculation value TCL2CAL of the second clutch 6 exceeds the upper limit temperature HTEMP2 for the first time until when the predetermined period of time T1 elapses, the temperature output value TCL2OUT of the second clutch 6 continues to be lower than the upper limit temperature HTEMP2, and the warning lamp 56 does not turn on (S33→S37 in FIG. 5).

The warning lamp 56 is turned on for the first time when the predetermined period of time T1 elapses and the temperature calculation value TCL2CAL of the second clutch 6 is outputted as the temperature output value TCL2OUT of the second clutch 6 (S6→S7 in FIG. 3), and when the temperature output value TCL2OUT of the second clutch 6 continues to be higher than the upper limit temperature HTEMP2 for the predetermined period of time T2 (S35→S36 in FIG. 5).

Meanwhile, when the temperature calculation value TCL2CAL of the second clutch 6 exceeds the upper limit temperature HTEMP2 for the second or the subsequent time, (NO in S1 of FIG. 3), the temperature calculation value TCL2CAL of the second clutch 6 is outputted as the temperature output value TCL2OUT of the second clutch 6 (S10 in FIG. 3). Therefore, the warning lamp 56 is turned on (S35→S36 in FIG. 5) when the temperature calculation value TCL2CAL of the second clutch 6 exceeds the upper limit temperature HTEMP2 and simultaneously the temperature output value TCL2OUT of the second clutch 6 exceeds the upper limit temperature HTEMP2, and when this state is continued for the predetermined period of time T2.

Therefore, the period of time from when the temperature calculation value TCL2CAL of the second clutch 6 exceeds the upper limit temperature HTEMP2 until when the warning lamp 56 is turned on is longer by the predetermined period of time T1 in the case when the temperature calculation value TCL2CAL of the second clutch 6 exceeds the upper limit temperature HTEMP2 for the first time, than the case of the second time.

Heat resistance of the second clutch 6 differs depending on whether or not the second clutch 6 experiences the burning exceeding the upper limit temperature HTEMP2, and the heat resistance is high when the second clutch 6 has no experience of the burning. When the period of time until the warning lamp 56 is turned on is made longer when the temperature calculation value TCL2CAL of the second clutch 6 exceeds the upper limit temperature HTEMP2 for the first time, it is possible to call attention to the driver at more appropriate timing, corresponding to the heat resistance of the second clutch 6.

As a specific method for causing the period of time until the warning lamp 56 is turned on to become longer only when the temperature calculation value TCL2CAL of the second clutch 6 exceeds the upper limit temperature HTEMP2 for the first time, such a method is employed that the constant value (pseudo temperature), lower than the upper limit temperature HTEMP2, is outputted from the power train controller 51 to the power source controller 50 during the predetermined period of time T1 (S6→S8 in FIG. 3), and the power source controller 50 is made to recognize that the temperature of the second clutch 6 is lower than the upper limit temperature HTEMP2 during this period.

Thus, the above-described operations can be realized by changing the control details on the power train controller 51 side only (FIG. 3), without changing the control details on the power source controller 50 side (FIG. 5). This method is effective especially when there are restrictions in changing the control details on the power source controller 50 side.

When it is possible to change the control details on the power source controller 50 side, similar control can be made by changing the predetermined period of time T2 depending on whether or not the temperature calculation value TCL2CAL of the second clutch 6 exceeds the upper limit temperature HTEMP2 for the first time.

Although embodiments of the present invention are described above, the above-described embodiments are merely examples of the present invention, and are not intended to limit the technical scope of the present invention to the concrete structure of the above-described embodiments.

According to the above-described embodiments, for example, the warning lamp 56 is turned on to inform the driver that the temperature of the second clutch 6 becomes high, but other methods, such as voice, an alarm, a message on a display, and the like may be used.

Further, the friction element for monitoring the temperature is not limited to the second clutch 6, and a brake or a clutch that is provided on another position, or a brake or a clutch that does not make the WSC control may be employed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A temperature warning device of a friction element for issuing a warning depending on temperature of the friction element arranged between a power source and a driving wheel, comprising:
   a warning issuing unit that issues the warning when the temperature of the friction element exceeds an upper limit temperature and a state in which the temperature of the friction element exceeds the upper limit temperature continues; and
   a warning issuing timing adjusting unit that makes a period of time, from when the temperature of the friction element exceeds the upper limit temperature until when the warning issuing unit issues the warning, longer when the temperature of the friction element exceeds the upper limit temperature for a first time and the state in which the temperature of the friction element exceeds the upper limit temperature continues, than when the temperature of the friction element exceeds the upper limit temperature for a second or subsequent time and the state in which the temperature of the friction element exceeds the upper limit temperature continues.

2. The temperature warning device of the friction element according to claim 1, further comprising:
   a friction element temperature calculating and outputting unit that calculates the temperature of the friction element on the basis of an operation state of the friction element, and outputs a calculation value of the temperature of the friction element to the warning issuing unit,
   wherein the warning issuing timing adjusting unit is formed by the friction element temperature calculating and outputting unit outputting, for a predetermined period of time, a value lower than the upper limit temperature, instead of the calculation value of the temperature of the friction element, to the warning issuing unit, when the calculation value of the temperature of the friction element exceeds the upper limit temperature for a first time.

3. A temperature warning method of a friction element for issuing a warning depending on temperature of the friction element arranged between a power source and a driving wheel, comprising:
   issuing the warning when the temperature of the friction element exceeds an upper limit temperature and a state in which the temperature of the friction element exceeds the upper limit temperature continues; and
   making a period of time, from when the temperature of the friction element exceeds the upper limit temperature until when the warning is issued, longer when the temperature of the friction element exceeds the upper limit temperature for a first time and the state in which the temperature of the friction element exceeds the upper limit temperature continues, than when the temperature of the friction element exceeds the upper limit temperature for a second or subsequent time and the state in which the temperature of the friction element exceeds the upper limit temperature continues.

4. A temperature warning device of a friction element for issuing a warning depending on temperature of the friction element arranged between a power source and a driving wheel, comprising:
   warning issuing means for issuing the warning when the temperature of the friction element exceeds an upper limit temperature and a state in which the temperature of the friction element exceeds the upper limit temperature continues; and
   warning issuing timing adjusting means for making a period of time, from when the temperature of the friction element exceeds the upper limit temperature until when the warning issuing means issues the warning, longer when the temperature of the friction element exceeds the upper limit temperature for a first time and the state in which the temperature of the friction element exceeds the upper limit temperature continues, than when the temperature of the friction element exceeds the upper limit temperature for a second or subsequent time and the state in which the temperature of the friction element exceeds the upper limit temperature continues.

* * * * *